UNITED STATES PATENT OFFICE.

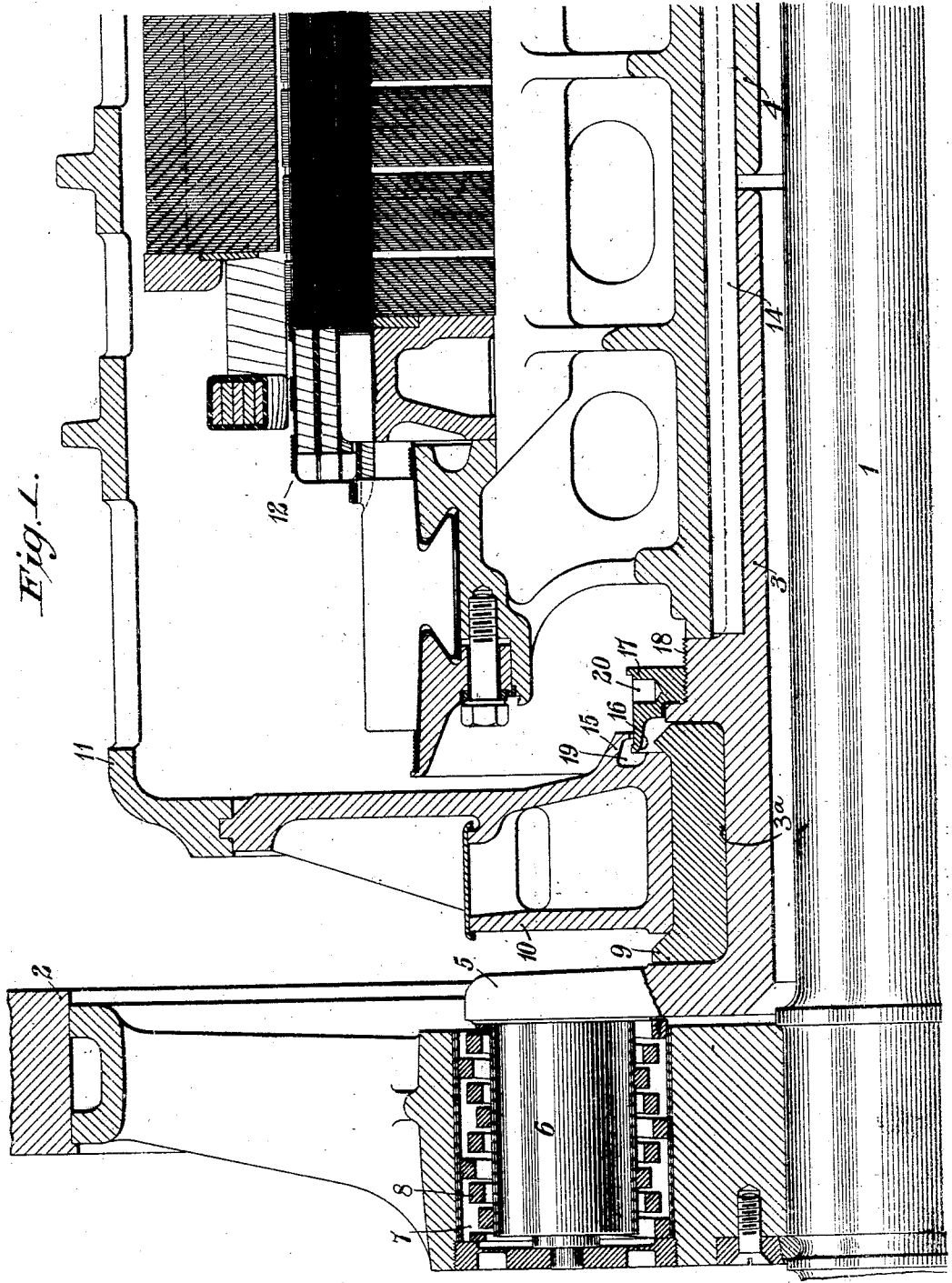

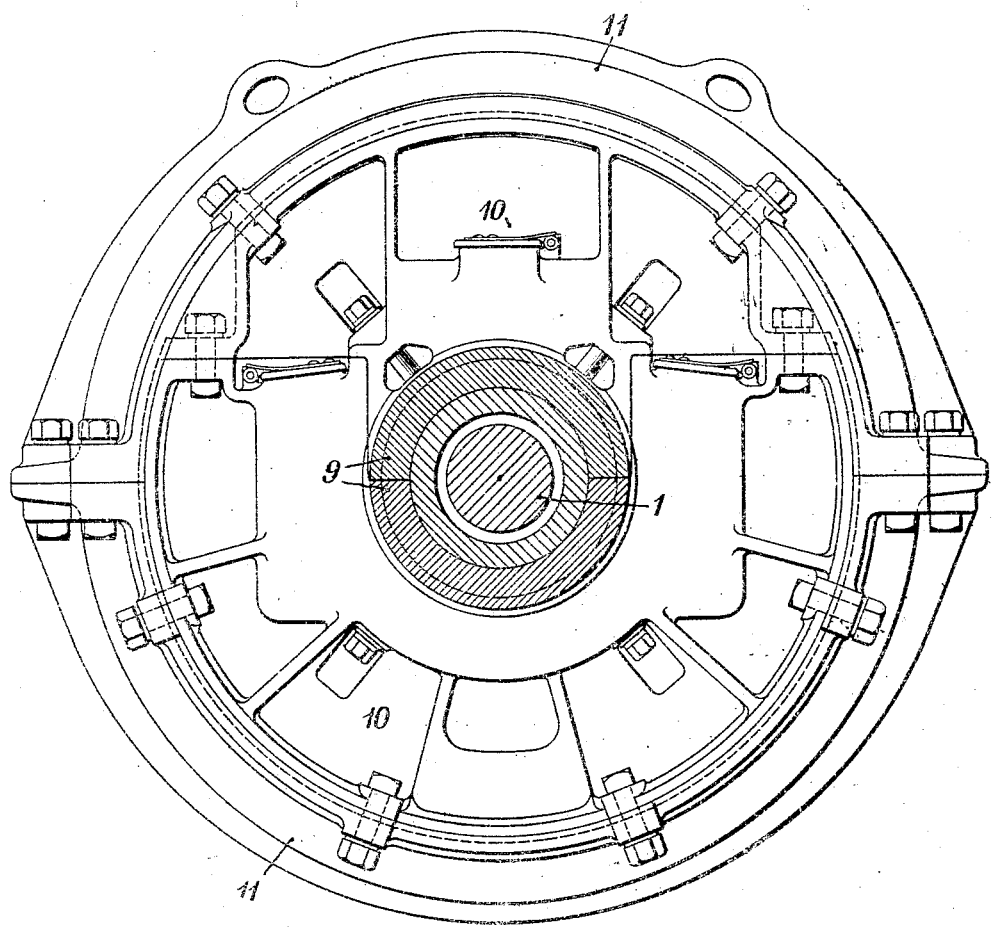

CHARLES A. PSILANDER, OF PITTSBURGH, PENNSYLVANIA, ASSIGNOR TO WESTINGHOUSE ELECTRIC & MANUFACTURING COMPANY, A CORPORATION OF PENNSYLVANIA.

MEANS FOR PREVENTING THE CREEPING OF OIL UPON SHAFTS OR AXLES.

1,124,658.

Specification of Letters Patent.

Patented Jan. 12, 1915.

Application filed January 3, 1906. Serial No. 294,412.

*To all whom it may concern:*

Be it known that I, CHARLES A. PSILANDER, a citizen of the United States, and a resident of Pittsburgh, in the county of Allegheny and State of Pennsylvania, have invented a new and useful Improvement in Means for Preventing the Creeping of Oil upon Shafts or Axles, of which the following is a specification.

My invention relates to means for preventing the creeping of oil upon shafts or axles and it has for its object to provide an improved means of the character indicated.

The shafts or the rotatable members of dynamo-electric and other machines are frequently provided with rings or flanges in proximity to the bearings from the edges of which oil that creeps along the shafts from the bearings is thrown by centrifugal force into corresponding recesses in the stationary members. The rings or flanges have heretofore been formed integral with or have been fixed to the shafts or rotatable members, but with such structures the axial lengths of the bearings have been limited in order to permit of removal thereof.

My present invention provides a structure in which the ring or flange projects over the end of the bearing and is adjustable longitudinally of the shaft so as not to interfere with ready removal of the bearings, and it has particular application to motors that are mounted upon quills or sleeves that surround the driving axles of the vehicles upon which they are mounted and that are directly and resiliently connected to the driving wheels, though it is not restricted to such specific application.

Figure 1 of the accompanying drawing is a view in longitudinal section of part of an electric motor that embodies my invention and Fig. 2 is an end elevation of the motor, the axle, quill and motor bearing being in section.

Surrounding a driving axle 1 upon the end of which the driving wheel 2 is mounted, is a quill that comprises two sections 3 and 4, respectively, the outer end of the section 3 being here shown as provided with radial arms 5 having an annularly disposed set of bosses 6, that project into corresponding chambers 7 in the driving wheel and that are surrounded within the chambers by springs 8, whereby a resilient connection is provided between the quill and the driving wheel. The quill section 3 is provided with a circumferential recess 3ª adjacent to the arms 5 to receive a bearing 9 which is supported in an end bracket 10 of the stationary frame or field magnet structure 11 of the motor for actuating the wheel 2. An armature 12 or other rotatable member, is mounted upon the quill sections 3 and 4 which are pressed into it from opposite ends and are further secured thereto by means of a feather key 14.

The inner face of the end bracket 10 is provided with an inwardly projecting annular flange 15 that overhangs both the inner end of the bearing 9 and the flared edge of an annular flange 16 that is part of a ring 17, the latter being screw threaded upon a shoulder 18 on the quill section 3. An annular recess 19 is also provided in the end bracket 10 directly within the flange 15, by means of which the oil may be collected and conveyed away.

In case removal of the bearing 9 is found necessary or desirable it is essential to first remove the frame 11 and the end bracket 10. The ring 17 may then be turned, by means of a wrench of suitable structure to engage the holes 20, until the flange 16 no longer overhangs the inner end of the bearing. All obstructing parts being thus removed or displaced, the bearing may be taken from its recess 3ª without difficulty.

While my invention has been shown and described as applied to electric motors for propelling vehicles it is, of course, obvious that it may be more generally applied and that structural modifications may be made within considerable limits, without departing from the spirit of the invention.

I claim as my invention:

1. The combination with a rotatable quill having a circumferential depression at one end, a machine frame having a divided repression and provided with an internal annular recess adjacent to one end of said bearing sleeve, of a ring screw-threaded upon said quill and having a flange that normally projects laterally over the end of the bearing sleeve and into the recess in the machine frame but that may be withdrawn therefrom by longitudinal adjustment of the ring.

2. The combination with a rotatable quill having a circumferential depression at one end, a machine frame having a divided removable bearing sleeve located in said depression and provided with an internal annular recess adjacent to the inner end of the bearing sleeve, of a ring adjustably mounted upon the quill and having a flange that normally projects laterally over the end of the bearing sleeve and into the recess in the machine frame but that may be withdrawn therefrom by longitudinal adjustment of the ring.

3. The combination with a rotatable quill having a circumferential depression at one end, a machine having a divided removable bearing sleeve located in said depression and provided with an internal recess adjacent to one end of the bearing sleeve, of a ring so mounted upon the quill as to be longitudinally adjustable and having a flange that normally projects laterally over the end of the bearing sleeve and into the recess in the machine frame but that may be withdrawn therefrom by longitudinal adjustment of the ring.

4. The combination with a quill having a circumferential depression at one end, a machine having a divided removable bearing sleeve located in said depression and provided with an internal annular recess adjacent to one end of the bearing sleeve, and a laterally projecting flange surrounding the recess, of a ring so mounted upon the quill as to be longitudinally adjustable thereon and having a flange that normally projects laterally over the end of the bearing sleeve and into the recess in the machine frame but that may be withdrawn therefrom by longitudinal adjustment of the ring.

In testimony whereof, I have hereunto subscribed my name this 29th day of December, 1905.

CHARLES A. PSILANDER.

Witnesses:
E. TIDLUND,
BIRNEY HINES.